(12) United States Patent
Lamers

(10) Patent No.: US 6,173,860 B1
(45) Date of Patent: Jan. 16, 2001

(54) HANDLE

(75) Inventor: Heinz-Günter Lamers, Attendorn (DE)

(73) Assignee: Gebr. Dingerkus GmbH & Co. KG, Attendorn (DE)

( * ) Notice: Under 35 U.S.C. 154(b), the term of this patent shall be extended for 0 days.

(21) Appl. No.: 09/180,220

(22) PCT Filed: Apr. 26, 1997

(86) PCT No.: PCT/DE97/00878

§ 371 Date: Nov. 3, 1998

§ 102(e) Date: Nov. 3, 1998

(87) PCT Pub. No.: WO97/45046

PCT Pub. Date: Dec. 4, 1997

(30) Foreign Application Priority Data

May 29, 1996 (DE) .............................. 196 21 524
Dec. 20, 1996 (DE) .............................. 196 53 228

(51) Int. Cl.$^7$ ....................................... A47J 45/06
(52) U.S. Cl. ................. 220/759; 220/573.1; 220/763
(58) Field of Search .................... 220/756, 759, 220/762, 763, 764, 573.1

(56) References Cited

U.S. PATENT DOCUMENTS

| 66,173 | * | 6/1867 | Robinson | 220/763 X |
| 1,490,568 | * | 4/1924 | Koenig . | |
| 2,361,417 | * | 10/1944 | Reichart | 220/759 X |
| 3,777,094 | * | 12/1973 | Peters, Jr. | 220/573.1 |
| 3,838,680 | * | 10/1974 | Shipman . | |

FOREIGN PATENT DOCUMENTS

| 0247229 | * | 12/1987 | (EP) . |
| 2086981 | * | 5/1982 | (GB) . |
| 2171450 | * | 8/1986 | (GB) . |

* cited by examiner

*Primary Examiner*—Steven Pollard
(74) *Attorney, Agent, or Firm*—Herbert Dubno

(57) ABSTRACT

Cookware is provided with a swingable handle via a mounting assembly which has an actuator which, upon depression, allows the handle to be swung from an extended position into a position in which the handle overlies the cookware or it tangential thereto. The handle can be locked in either of its extreme position.

11 Claims, 7 Drawing Sheets

HANDLE

CROSS REFERENCE TO RELATED APPLICATION

This application is a national stage of PCT/DE97/00878 filed Apr. 26, 1997 and based, in turn, upon German national applications 196 21 524.2 of May 29, 1996 and 196 53 228.0 of Dec. 20, 1996 under the International Convention.

FIELD OF THE INVENTION

The invention relates to a handgrip for a cookware item.

BACKGROUND OF THE INVENTION

A handgrip for a cookware item, particularly for roasting, baking or boiling purposes, which can be secured to the wall of a cookware item by means of a fastening element, is known from EP 02 47 229A1. The handgrip or a substantial part thereof can be pivoted about a vertical axis from an operating position wherein the handgrip projects transversely from the cookware, into a rest position wherein the handgrip is approximately parallel or tangential to the wall of the cookware item, or wherein it engages over the opening or the surface of the same. The handgrip consists of a base portion and of a handle swingably supported in the base portion, the latter having a guide surface with an annular guide groove or an annular projection, which is centrally traversed by the swivel axis, and the handle has a matching guide surface or a guide projection or guide groove in its end area connecting it to the base portion, whereby the interengaging and mutually contacting guide elements are held together by a connection means forming the swivel axis.

On the manipulating part of the handgrip a tubular projection is arranged and on the fastening element provided on the pot side there is also a projection, the two interengage, whereby their position with respect to each other is secured by the groove and by the snap ring set therein. This design is usable, but in practice creates a considerable problem. Namely to the extent that a wobble-free fit of the handgrip on the fastening element is supposed to be achieved, an extremely tight fit of the projections is required. This translates into high manufacturing costs, and besides the narrow fit impairs the rotatability of the parts with respect to each other.

OBJECT OF THE INVENTION

It is the object of the invention to provide a handgrip wherein a perfect centering and guidance between the base portion and the swingable handle is insured, even when the cooperating separate parts have manufacturing tolerances.

SUMMARY OF THE INVENTION

This object is achieved by the invention which provides a swivel axis consisting of a bearing bushing supported by means of a flange on the outside of the handle, penetrating through the handle and the base portion, and fixed by means of a fastening element supported outside of the base Portion. The fastening element consists of an annular or cylindrical spring element and of a cap screw traversing the assembly axially, whereby the spring element is an arched spring plate whose central area can be firmly pulled against the bottom part of the bearing bushing by means of the cap screw and whose marginal area rests against the bottom part of the base portion when prestressed.

Due to this arrangement, on the one hand an appropriate guidance over the entire swivel path is achieved, whereby already due to the interengaging guide elements the stability of the connection between the handgrip and the cookware parts is insured. Furthermore the bearing bushing can be fixed in an appropriate manner on the base portion and secured thereto by means of the fastening element, whereby the bearing bushing forms the pivot bearing for the handle. This arrangement allows for a simple assembly, whereby in addition it is insured that the separate components can be replaced, especially the bearing bushing or the handle, when one of these parts is damaged or is no longer effective.

Further due to the bearing bushing part a perfect centering and guidance is insured. The axial play in this in this swivel joint is eliminated, especially due to the construction of the spring element as a cup spring, whereby a certain shock absorption effect is achieved. By means of the fastening element the connection is brought to the desired level of preliminary stress, so that in spite of the tolerance. in the fabrication of the separate components, a tight fit can be achieved while thereby insuring the rotatability.

Preferably the vertical axis is parallel to the central axis of the cookware item, or is slightly inclined with respect to the latter.

As a rule cookware items are circular, so that the central axis of this circular shape is practically the central axis of the cookware. The vertical axis which constitutes the swivel axis of the handgrip has to be parallel or sightly inclined with respect to the central axis.

Preferably the handgrip can be arrested in the two possible extreme positions.

Furthermore it is particularly advantageous to insert in the bearing bushing, at its flange end, a spring element and a service part which can be axially displaced in the direction of the bearing bushing under the action of the prestressed spring, and which is transversely penetrated by a locking pin, whereby the locking pin traverses the bearing bushing transversely to its longitudinal axis, through slots running parallel to the longitudinal bearing bushing axis and projects radially beyond the bearing bushing, as well as engages in axial arresting grooves which radially surround the area of the handle, so that when the service part is not under load, the swingability of the handle into the position of use or into the rest position is prevented, and when the service part is axially under load and displaced, the ends of the locking pin are no longer engaged in the axial arresting grooves and the handle and the bearing bushing are swingable.

Thereby the cylindrical service part is advantageously provided with a push button.

Due to the spring-loaded service part (push button with locking pin) the release and the locking of the rotatable handle in the two target positions is safely and simply insured, and the functional elements are easily handled, whereby the service part is preferably arranged on the upper part of the handle assembly, so that the user can actuate the service part with the thumb, while holding the handgrip with his hand.

It is also particularly advantageous when the contacting guide surfaces of the base portion and the handle are coated with friction-reducing material, or when between the surfaces slide disks of such a material are provided.

Advantageously the friction-reducing material is PTFE. For instance by means of two PTFE disks (polytetrafluoroethylene disks), which are arranged in the area of the guide surfaces on the upper and lower side of the handle or on the base portion, a desired easy rotatability of the handle is insured, in spite of the corresponding preliminary stress.

Although in the usual cookware items, for instance pans or the like, the handgrip in the rest position lies advantageously approximately tangentially on the peripheral wall of the cookware item, a displacement of the handgrip is also possible so that the handgrip in the use position projects quasi radially from the corresponding cookware item, while in the rest position the handgrip is swung inwards, so that it is arranged quasi over the opening of the cookware, or in case there is a cover, over the cover surface, so that only unessential radial projections remain. The projections which remain outside the cookware item are not bigger than in the case of the usual bow-type handgrip or the like, so that especially when arranged in a package or the like, these projecting areas are set in the corners of the box, so that no additional space is required inside the package.

In order to achieve a firm fit in the use position also in the presence of manufacturing tolerances, the invention proposes that the base portion and the handgrip be made of a thermosetting material and the bearing bushing of a thermoplastic material, whereby the outer diameter of the bearing bushing in the area where it traverses the central hole of the handle of the handgrip is smaller than the diameter of the central hole, so that the parts interengage with radial play.

Due to the fact that the handgrip and also the bearing bushing together with the service part are made of plastic material, a cost-effective production is possible. By using the thermosetting material for the base portion and the handgrip, a thick-walled execution is made possible insuring the strength of the interengaging parts (annular groove and annular guide surfaces), while the bearing bushing can be made with relatively thin walls, by using thermoplastic material.

The fact that the bearing bushing is made of thermoplastic material has the effect, over a longer period of time, that this part increases its diameter slightly, because the material swells slightly due to water absorption. Thereby a definite fit would not be insured and possibly a autual jamming of the parts would occur when the parts are too tightly fitted. In order to avoid this, the outer diameter of the bearing bushing is smaller by the usual tolerance range than the inner diameter of the central hole which receives the bearing bushing. In the manufactured state the parts are thus arranged with respect to each other with radial play and engage into each other. Thereby the bearing bushing has no guide function or only unessential guide functions, because the actual guidance is achieved through the annular guide groove and the corresponding annular guide surfaces, which form almost a turntable, which remains functional over time, since by using thermosetting plastic as the material the tolerances do not change over long periods of use. Altogether the fixation takes place by screwing the spring disk underneath the base portion, so that a firm prestressing of the connection is achieved, which still allows for a certain spring action. As a result of the sufficient play between bearing bushing and the area receiving the bearing bushing in the hole of the handle, a long-term function is insured, even if the thermoplastic material of the bearing bushing does swell over a longer use period.

In order to achieve a nonrotatable arrangement of the bearing bushing in a simple manner, the invention proposes that the threaded end of the bearing bushing have a polygonal cross section and that the insertion zone in the hole of the base portion be shaped accordingly.

In order to insure a play-free mounting of the locking pin in the slots of the bearing bushing, the slots of the bearing bushing, at least in their end area close to the opening (of the bearing bushing) can be narrowed down in a conical or wedge-like manner, and that the locking pins can engage play-free in this narrowed part.

Due to this construction, a play-free arrangement is achieved, wherein also a tolerance compensation is possible, as long as the slots are narrowed as a result of the swelling tendency of the thermoplastic material.

In order to achieve a play-free arrangement of the locking pin in the arresting grooves in the area of the handle radially surrounding the bearing bushing, while still making possible an easy assembly, the arresting grooves of the area of the handle radially surrounding the bearing bushing can be arranged in pairs opposite to each other, whereby such a pair of arresting grooves, wherein the locking pin engages with play in the inwardly swung rest position, can be formed by axial grooves, which have parallel groove flanks, while a second pair of arresting grooves wherein the locking pin engages in the outwardly swung use position, can be formed by axially running grooves with converging groove flanks, at least in the end area facing the upper side of the handgrip, between which the locking pin can be inserted play-free.

The one pair of arresting grooves which has parallel grooves flanks Serves for assembly and is used also after assembly for receiving the locking pin in the inwardly swung rest position. Here a sufficient play between the groove flanks and the locking pin is desirable, in order to facilitate the assembly, whereby in the inwardly swung position no play-free arrangement is achieved, which is also not necessary. In the use position, i.e. when the handgrip is swung outwards, the ends of the locking pin sit in the second groove pair with the converging groove flanks, between which the ends of the locking pin can be inserted without play, so that in the use position a mutual play-free arrangement of the parts is insured and reached.

BRIEF DESCRIPTION OF THE DRAWING

Embodiments of the invention are represented in the drawing and are described in greater detail below.

In the drawing.

SPECIFIC DESCRIPTION

Figure 1:
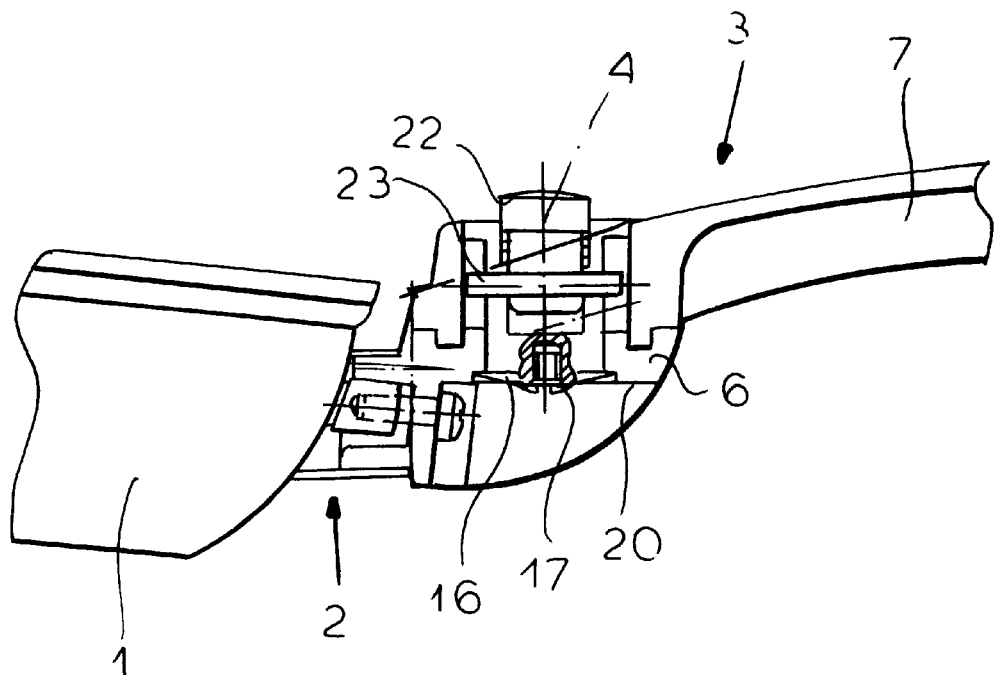
FIGS. 1 to 3 show a cookware item with the handgrip in the use position respective in a side view, partially sectioned, in a top view and a bottom view (as a detail)
Figure 2:
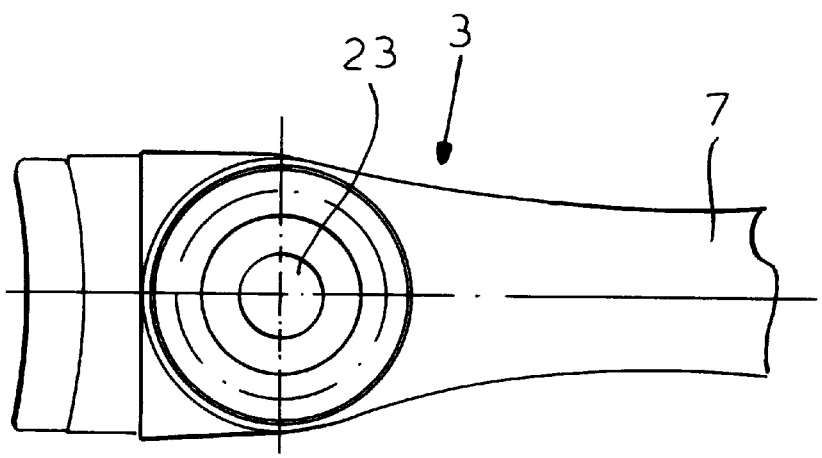
Figure 3:
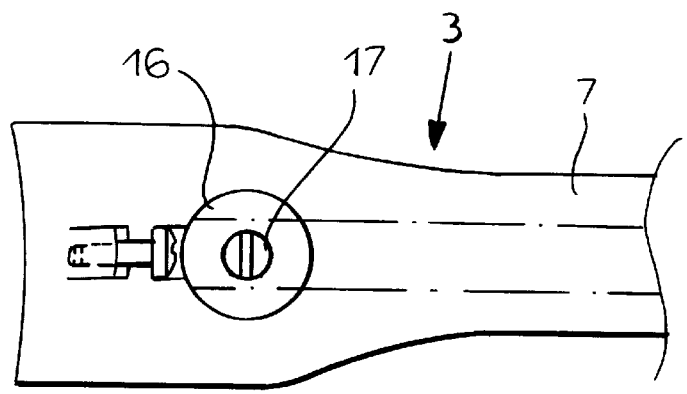
Figure 4:
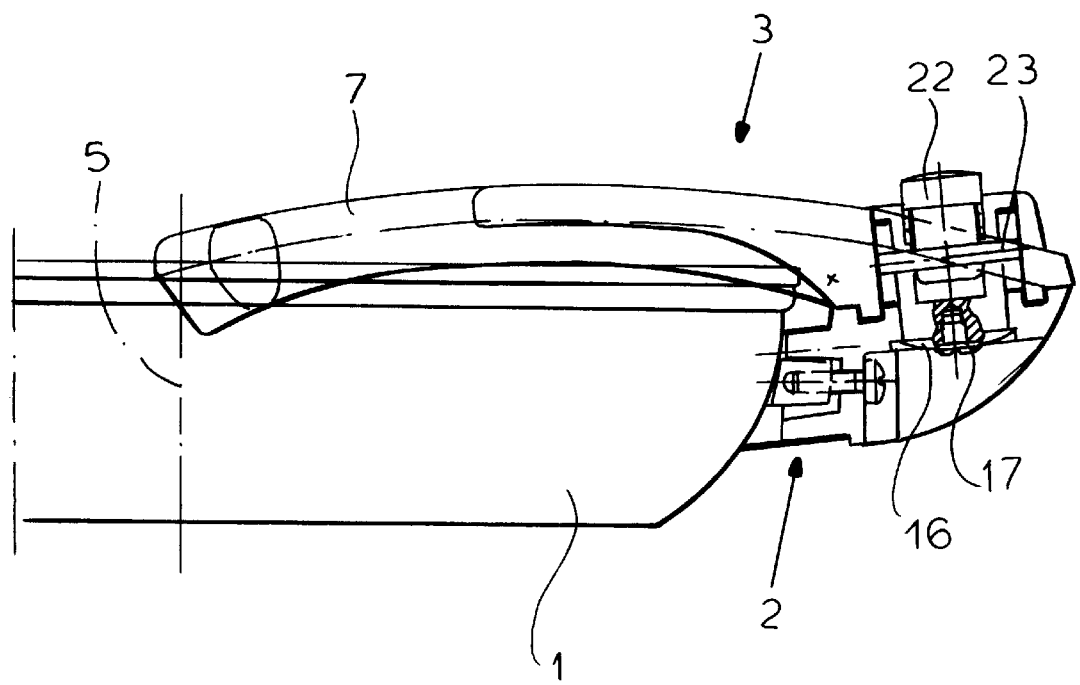
FIGS. 4 and 5 show a side view and a top view of a cookware item with the handgrip in the rest position.
Figure 5:
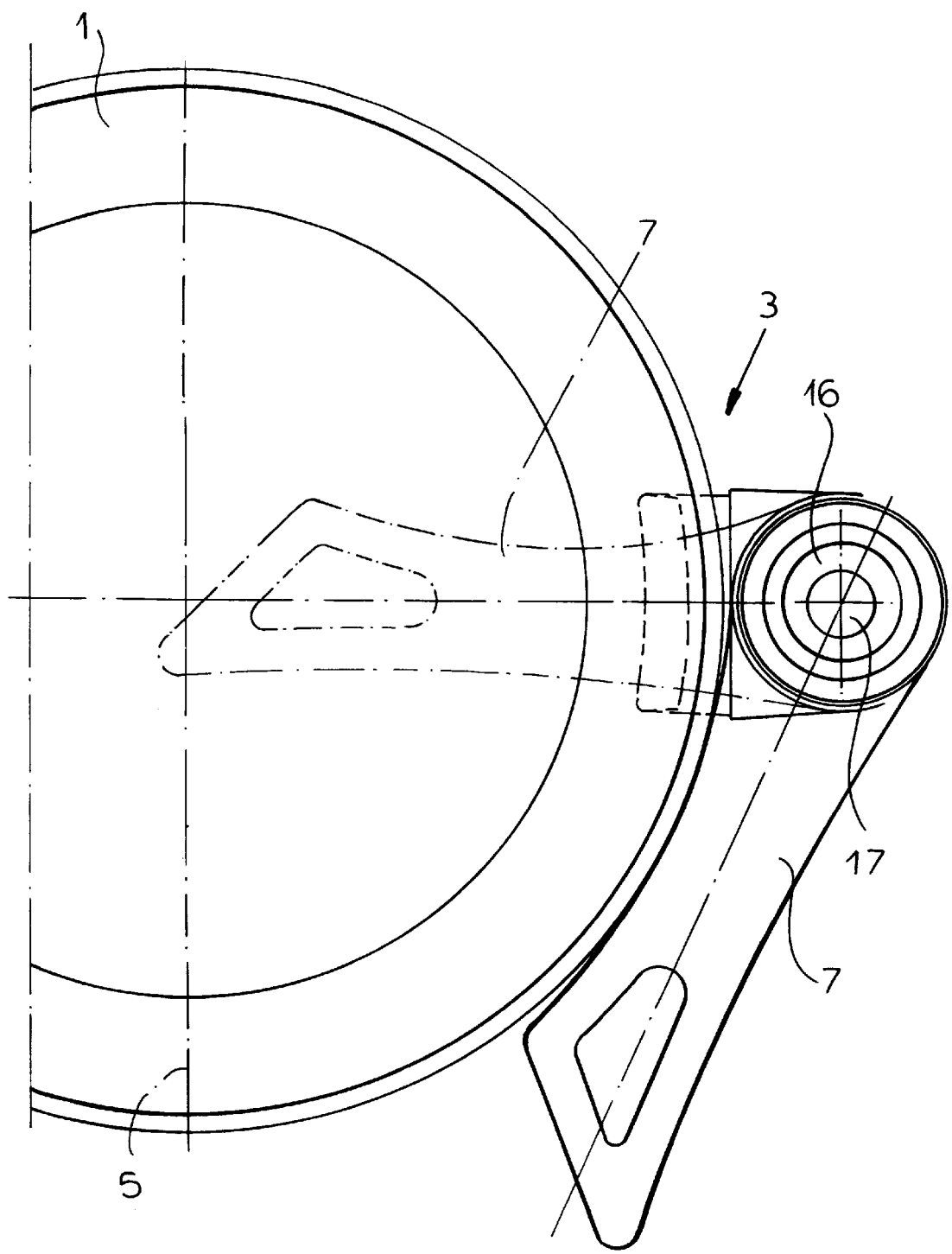

The drawing shows a handgrip for a cookware item 1, in the embodiment example a frying pan. The handgrip can be fastened to the side wall of the cookware item 1 by means of a fastening element 2. The handgrip 3, or an essential part of the handgrip, can be swung about a vertical axis 4 from a use position transversely projecting from the cookware item 1 (see FIGS. 1 to 3) into a rest position parallel or tangential to the wall of the cookware item, as shown in FIGS. 4 and 5 in solid lines, or also into a rest position wherein it engages over the opening or a surface of the cookware item 1, as shown in FIG. 5 in dash-dot lines. The vertical axis 4 can be parallel to the central axis 5 of the cookware item 1 or can be slightly inclined with respect to the central axis, as can be seen particularly from the illustration of FIG. 6. Advantageously the handgrip 3 consists of a base portion 6 which can be fastened to the wall of the cookware item 1 and a handle 7 supported in the base portion 6 so that it can swing (about the axis 4).

The base portion 6 has guide surfaces 8, 9 with an annular guide groove 10, which is centrally traversed by the pivot axis 4, while the handle 7 has a matching. guide surface 11, respectively 12 with guide projection 13, in its end area where it can be connected to the base portion 6. The target position can be for instance seen in FIG. 1 and FIG. 4. The interengaging and mutually contacting guide elements are kept together by a connection means forming the pivot axis or parts of the pivot axis.

Advantageously the pivot axis 4 is formed by a bearing bushing 14, which is supported by a flange 15 on the (upper) external side of the handle 7. The arrangement is laid out so that the flange 15 lies practically flush in the bottom side of the handle 7. The bearing bushing 14 penetrates through the base portion 6 and can be fixed by a fastening means supported outside of the base portion 6.

The fastening means consists of an annular spring element, preferably in the form of an arched spring disk, and a cap screw 17 axially traversing the same, preferably a cap screw, which can be screwed into a thread 30 formed in the bottom of the bearing bushing 14. In the mounted position, the spring element 16 designed as an arched spring disk is tightened firmly with its offset central portion 18 against the bottom side 19 of the bushing 14 by means of the fastening element 17. Thereby the border area of the spring element 16 under preliminary stress rests against the underside of the base portion at 20. This way even when certain separate parts have tolerances, a firm fixation of the parts to each other is achieved, whereby a certain springiness of the handle 7 is insured, without impairing the rotatability.

Figure 6:
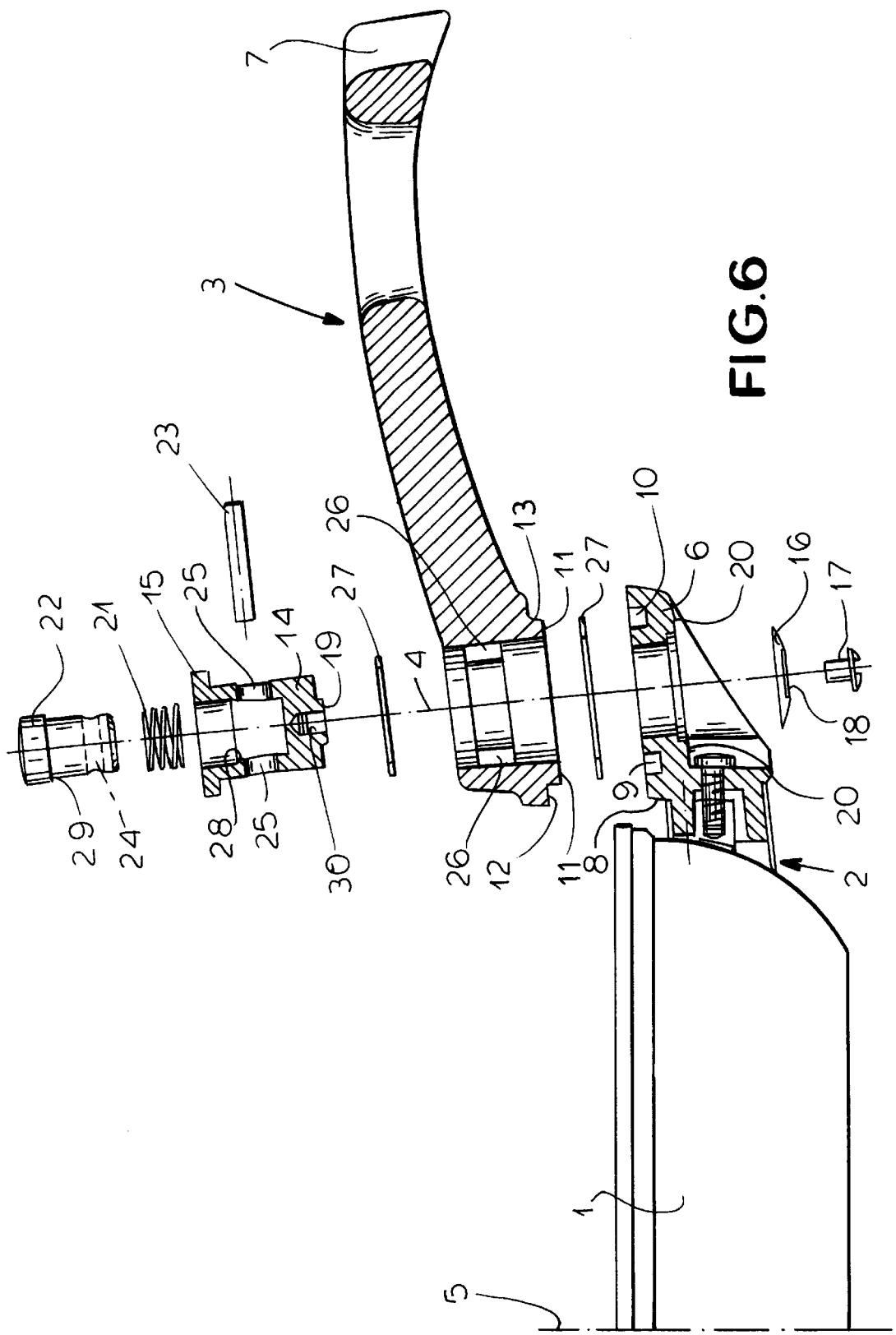
FIG. 6 shows a cookware item with the handgrip in an exploded view.

The handgrip 3, particularly the handle 7, can be arrested in both possible extreme positions. For this purpose in the embodiment example in the bearing bushing 14, at its end provided with flange 15, a spring element 21 and a service part 22 in the form of a cylindrical push button, which under preliminary stress can be displaced axially into the bearing bushing 14 and engage in the same, are provided. The push button is traversed by a locking pin 23, which can be inserted in a radial throughgoing bore 24 of the service part. The locking pin 23 traverses the bearing bushing 14 perpendicularly to its longitudinal axis in slots 25 which are parallel to its longitudinal axis, whereby the travel path of the service part 22 in the direction of the axis 4 is limited. The locking pin 23 radially projects beyond the bearing bushing 14. With the radially projecting ends the arresting pin 23 is inserted in arresting grooves 26 in the area of the handle 7 surrounding the bearing bushing 14, so that when the service part is relieved, as for instance seen in FIG. 1 and FIG. 4, the swingability of the handle 7 is precluded, since the ends of the locking pin 23 are engaged in the axial arresting grooves 26. When the service part 22 is axially under urn load and pushed downwards, as can be seen in FIG. 6, the ends of the locking pin 23 are out of their engagement with the axial arresting grooves 26, so that the handle 7 can be swung about the bearing bushing 14. The actuation of the service part 22 can be performed by the user in a simple manner, in that the user grips the handle 7 with his hand and with the thumb of the sane hand pushes down (actuates) the service part 22.

The mutually contacting guide surfaces 9, 11 of the base portion 6 and handle 7 are made particularly slidable by arranging between these surfaces slide disks 27 made of PTFE.

In the embodiment shown, the spring element 21 is a helical spring, whereby the helical spring is supported on the one side on a shoulder 28 of the bearing bushing 14, and on the other side on a corresponding support surface 29 of the service element 22.

For the assembly of the handgrip, at first the fastening element 2 has to be affixed to the wall of the cookware item 1, or it is possible to perform at first a complete assembly of the handgrip, as described below, and then the completely assembled handgrip can be affixed to the wall of the cookware item 1. The complete assembly of the handgrip 3 is done in the following manner. At first the disk 27 is inserted in the groove 10 of the base portion 6, then the handle 7 is attached with the corresponding matching surface and the further slide disk 27 is laid on. The upper slide disk 27 lies between the flange 15 of the bushing 14 and the upper side of the handle 7. Prior to that the bushing 14 was completely assembled by inserting the parts 21, 22 and 23. These parts are introduced in the handle 7 in the correct position.

The final fixation takes place by applying the spring element 16 and mounting the fastening element 17 (screwing it into the threaded bore 30).

Figure 7:
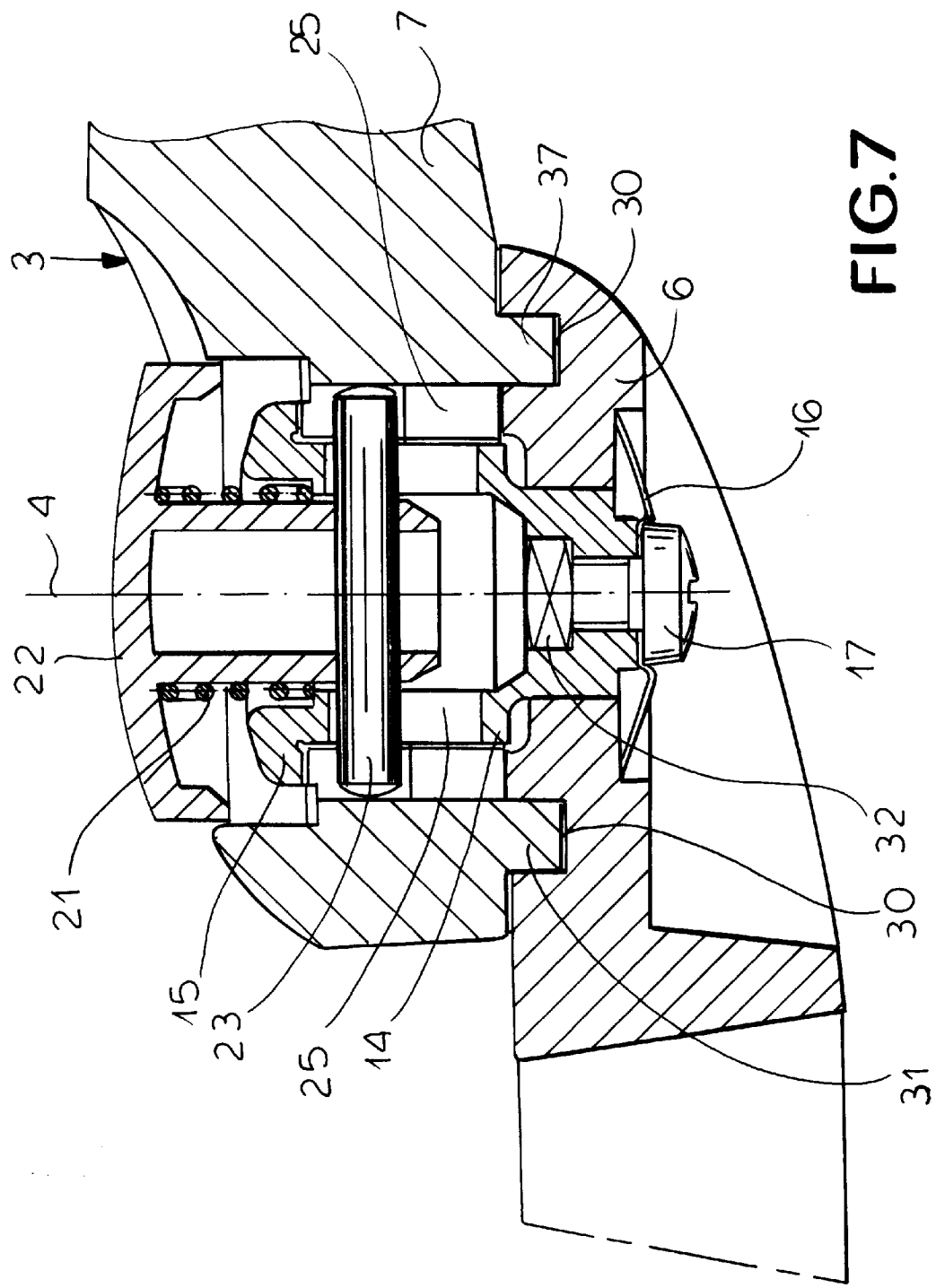
FIG. 7 is a view of the basic elements of the handgrip, seen in a median longitudinal section.
Figure 8:
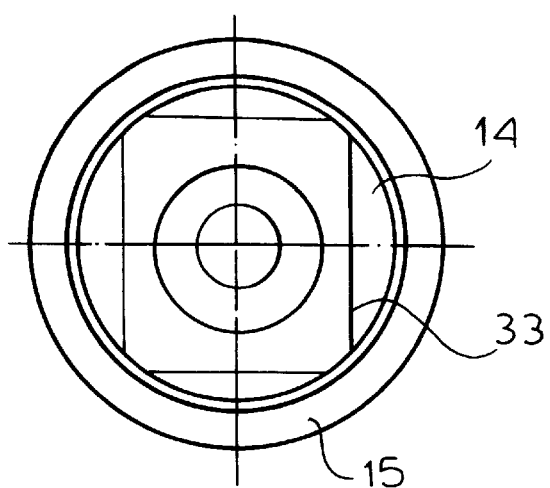
FIGS. 8 to 12 is a detail in various views.
Figure 10:
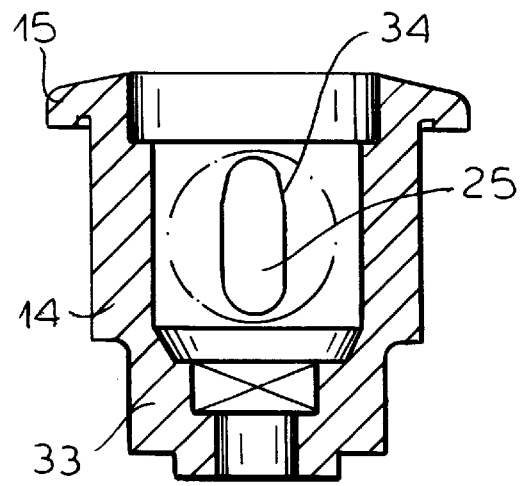

In FIG. 7 particularly a handgrip 3 for a cookware item is shown, which is fastened to the wall of the cookware item by means of a fastening element. The handgrip 3 can be swung about a vertical axis from the position of use, wherein it projects transversely from the cookware item, to a rest position which is tangential to the wall of the cookware item or reaches over the opening or a surface of the cookware item. The handgrip 3 consists essentially of a base portion 6 which can be fastened to the cookware item and a handle 7 pivotally supported on the base portion. The base portion 6 has an annular groove 30 which is centrally traversed by the pivot axis. At its end which can be connected to the base portion 6, the handle 7 has a matching guide surface with annular projections 31, whereby the interengaging and mutually contacting guide elements are kept together by a connection means forming the pivot axis.

The pivot axis 4 is formed by a bearing bushing 14, which rests against the outside of the handle 7 with a flange 15. It traverses the handle 7 and the base portion 6 and can be fixed by a fastening means supported outside of the base portion 6 (underneath). This fastening means consists of an annular or cylindrical spring element 16 and a fastening means axially traversing the same in the form of a cap screw 17, which can be screwed into a nut 32 nonrotatably supported in the bearing bushing 14. The spring element 16 is an arched spring disk, whose uiddle area is stepped and can be tightened firmly against the underside of the bearing bushing 14 by means of the cap screw 17, while the marginal area rests against the underside of the base portion 6 under preliminary stress. At its end provided with the flange 15, in the bearing bushing 14 a spring element 21 and a service part 22, which is axially slidable with respect to the bearing bushing under preliminary stress by the spring lament 21, are inserted, the latter being transversely penetrated by a locking pin 23. The locking pin 23 traverses the bearing bushing 14 transversely to its longitudinal axis, in slots 25 which are parallel to its longitudinal axis, and radially surpasses the bearing bushing 14 at both ends. With these ends the locking pin 23 engages in the axial arresting grooves 26, 26' through the area of the hole of the handle 7 radially surrounding the bearing bushing 14. When the service part 22 is not under load, the swingability of the handle 7 into the use position or the rest position is prevented, while when the service part 22 is axially under load and displaced, the ends of the locking pin 23 are not engaged by the axial arresting grooves 26, 26' and the handle 7 is correspondingly pivotable about the bearing bushing 14.

Preferably the base portion 6 and the handgrip 3 consist of thermosetting material, while the bearing bushing 14 and optionally the service part 22 are made of thermoplastic material. Thereby the outer diameter of the bearing bushing 14 in the area traversing the central hole of the handle 7 of the handgrip 3 is smaller than the diameter of the central hole, so that the parts interengage with radial play.

The end of the bearing bushing 14 provided with the thread formation 32 has a polygonal cross section. The polygon is marked with 33. The insertion area in the hole of the base portion 6 is correspondingly shaped, so that the parts are nonrotatable with respect to each other.

In the end zone close to their abutment (on top in the drawing), the slots 25 of the bearing bushing 14 are narrowed down conically or wedge-like. The narrowed portion is marked with 34. As a result the locking pin can at first engage with play in the wider area, before it penetrates the narrowed portion 34 where it is held without play.

Figure 9:
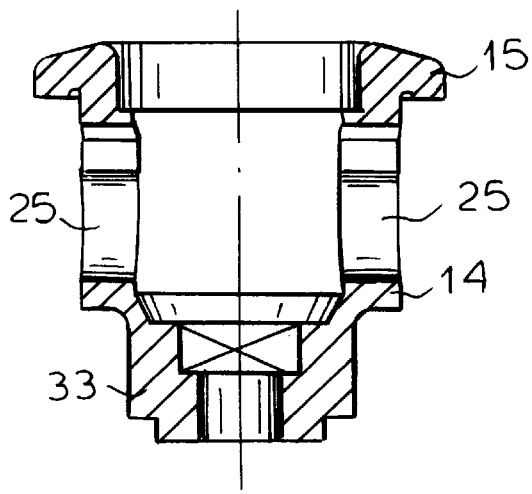
Figure 14:
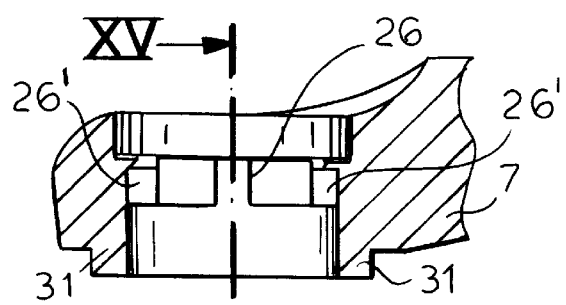
FIGS. 13 to 15 is a further detail in various views.
Figure 15:
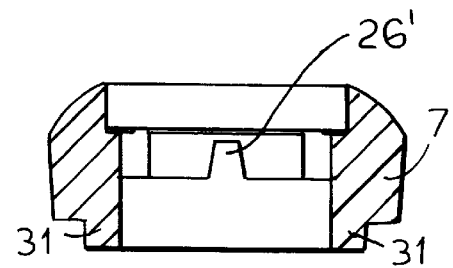
Figure 13:
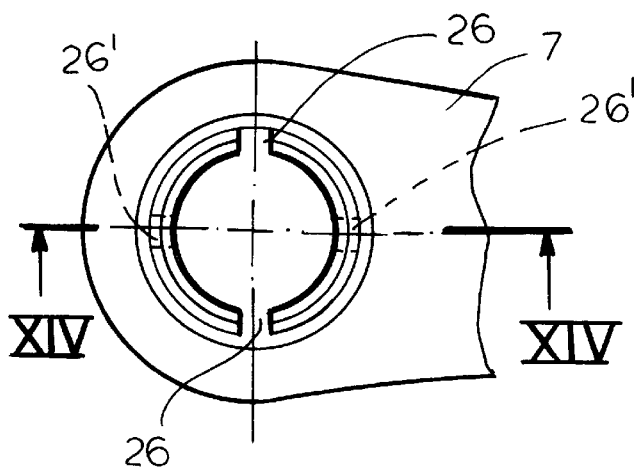
Figure 11:
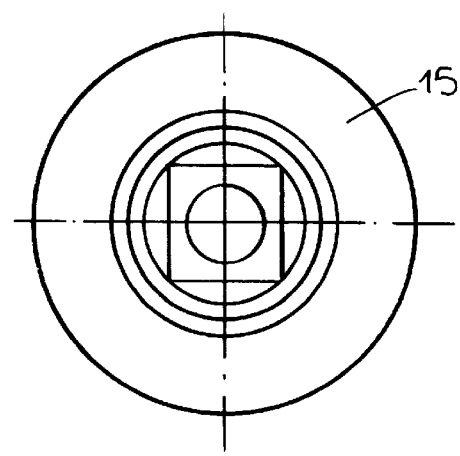
Figure 12:
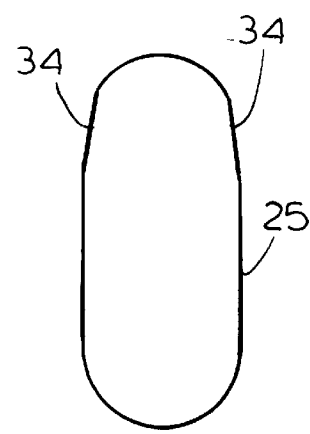

The axial grooves 26, 26' of the area of the handle 7 radially surrounding the bearing bushing 14 are arranged in pairs, opposite to each other, whereby such a pair of arresting grooves 26, wherein the locking pin 23 engages with play in the swung-in rest position, is formed by axial grooves with parallel flanks, thereby making possible an easy assembly and a fit of the locking pin which allows for play. The second pair of arresting grooves 26', wherein the locking pin 23 engages in the swung-out use position, is formed by axially oriented grooves with mutually converging flanks, as can be seen especially from FIG. 9. In these grooves the locking pin can engage at first with play, until it reaches the narrowed portion where it is held without play.

The invention is not limited to the embodiment example, but is widely variable within the framework of the disclosure.

I claim:

1. A handgrip for a cookware item, particularly cookware for roasting, baking or boiling purposes, which can be secured to the wall of a cookware item by means of a fastening element, whereby the handgrip can be pivoted about a vertical axis from an operating position wherein the handgrip projects transversely from the cookware item, into a rest position wherein the handgrip is approximately parallel to the wall of the cookware item or tangential thereto, or wherein it engages over the opening or a surface of the cookware item, the handgrip consisting of a base portion which can be affixed to the cookware item and a handle pivotally supported on the base portion, the base portion having a guide surface with an annular guide groove or an annular projection, which is centrally traversed by the pivot axis, and the handle being equipped at its end which can be connected to the base portion with a matching guide projection or guide groove, whereby the interengaging and mutually contacting guide elements are kept together by a connection element forming the pivot axis, the pivot axis formed by a bearing bushing which is supported by means of a flange on an outside of the handle, traverses the handle and the base portion and can be fixed by a fastening element supported on the outside of the base portion, the fastening element consisting of an annular or cylindrical spring element and a cap screw axially traversing the same, whereby the spring element is an arched spring disk whose middle portion can be tightened firmly against the underside of the bearing bushing by means of the cap screw, and whose marginal area rests against an underside of the base portion under preliminary stress.

2. The handgrip according to claim 1 wherein the pivot axis is to a central axis of the cookware item or is slightly inclined with respect to the central axis.

3. The handgrip according to claim 1 wherein the handgrip can be arrested in both possible extreme positions.

4. The handgrip according to claim 1 wherein in an end provided with the flange of the bearing bushing a spring element and a service part which is axially displaceable towards the bearing bushing under preliminary stress generated by the spring element are inserted, the service part being transversely penetrated by a locking pin, whereby the locking pin traverses the bearing bushing transversely to a longitudinal axis in slots parallel to said longitudinal axis and radially projects beyond the bearing bushing as well as engages in axial arresting grooves of an area of the handle radially surrounding the bearing bushing so that when the service part is not under load the swingability of the handle in the operating position or in the rest position is prevented and when the service part is displaced and under axial load, the ends of the locking pin are not engaged by the axial arresting grooves and the handle is swingable.

5. The handgrip according to claim 4 wherein the service part is a cylindrical push button.

6. The handgrip according to claim 1 wherein the mutually contacting guide surfaces of the base portion and the handle, as well of the flange and the handle, are coated with a friction-reducing material, or slide disks made of such a function-reducing material are arranged between the surfaces.

7. The handgrip according to claim 6 wherein the friction-reducing material is PTFE.

8. The handgrip according to claim 1 wherein the base portion and the handgrip are made of a thermosetting plastic material and the bearing bushing is made of a thermoplastic material, whereby the outer diameter of the bearing bushing in the area where it traverses the central hole of the handle is smaller than the diameter of the central hole, so that the parts interengage with radial play.

9. The handgrip according to claim 8 wherein an end of the bearing bushing is provided with a thread formation and has a polygonal cross section and an insertion area in the hole of the base portion is correspondingly shaped.

10. The handgrip according to claim 8, characterized in that the slots of the bearing bushing are narrowed conically or in a wedge-like manner at least in an end zone close to their abutment and that the locking pin engages in the narrowed zone without play.

11. The handgrip according to claim 8 wherein the arresting grooves of the area of the handle radially surrounding the bearing bushing are arranged in pairs opposite to each other, whereby such a pair of arresting grooves in which the locking pin engages with play in the swung-in rest position, is formed by axial grooves with parallel flanks, while a second pair of arresting grooves in which the locking pin engages in the swung-out use position, is formed by axially oriented grooves which have mutually converging flanks at least in end areas facing the upper side of the handgrip, between which the locking pin can be inserted without play.

* * * * *